United States Patent
Inada

(10) Patent No.: US 9,459,852 B2
(45) Date of Patent: Oct. 4, 2016

(54) EXECUTION CONTROL METHOD AND INFORMATION PROCESSING APPARATUS

(71) Applicant: FUJITSU LIMITED, Kawasaki-shi, Kanagawa (JP)

(72) Inventor: Yoshie Inada, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/695,344

(22) Filed: Apr. 24, 2015

(65) Prior Publication Data

US 2015/0234641 A1 Aug. 20, 2015

Related U.S. Application Data

(63) Continuation of application No. PCT/JP2012/077599, filed on Oct. 25, 2012.

(51) Int. Cl.
*G06F 9/45* (2006.01)
*G06F 9/30* (2006.01)

(52) U.S. Cl.
CPC ........... *G06F 8/452* (2013.01); *G06F 9/30058* (2013.01)

(58) Field of Classification Search
None
See application file for complete search history.

(56) References Cited

U.S. PATENT DOCUMENTS

| | | | | |
|---|---|---|---|---|
| 6,678,886 B2 * | 1/2004 | Kumon | ............... | G06F 8/445 717/135 |
| 2008/0127134 A1 | 5/2008 | Tirumalai et al. | | |

FOREIGN PATENT DOCUMENTS

| | | |
|---|---|---|
| JP | 59-165147 | 9/1984 |
| JP | 60-8942 | 1/1985 |
| JP | 3-110670 | 5/1991 |
| WO | 2012/087988 A2 | 6/2012 |

OTHER PUBLICATIONS

"FACOM VP System manual", ver. 3, Japan, Fujitsu Limited, 1988, pp. 103-108, 127-130.
International Search Report mailed on Jan. 22, 2013 in corresponding International Patent Application No. PCT/JP2012/077599.
Written Opinion of the International Searching Authority mailed Jan. 22, 2013 in corresponding International Application No. PCT/JP2012/077599.
Tyson, "The Effects of Predicated Execution on Branch Prediction", 27th International Symposium on Microarchitecture, 1994, San Jose, CA, pp. 196-206.

(Continued)

*Primary Examiner* — Chuck Kendall
(74) *Attorney, Agent, or Firm* — Staas & Halsey LLP

(57) ABSTRACT

While a first code, in an object code generated from a source code, for a loop included in the source code or a second code in the object code is executed, a feature amount concerning the number of times that a condition of a conditional branch is true is obtained. The loop includes the conditional branch, and the conditional branch is coded in the first code. The second code is a code to perform computation of a branch destination for a case where the condition of the conditional branch is true, only for loop indices that were extracted as the aforementioned case. Then, a processor executes, based on the feature amount, the second code or a third code included in the object code. The third code is a code to write, by using a predicated instruction and into a memory, any computation result of computations of branch destinations.

6 Claims, 16 Drawing Sheets

```
do I = 1, N
  if (x(i) > 0) then
    a(i) = b(i) + c(i)
    d(i) = e(i) * f(i)
    ...
enddo
```

RELATED ART
FIG.1A

```
fcmp   x, 0, fcc
fble   fcc, L0
  ┌─────────────────┐
  │ fadd   b, c, a  │
  │ fmul   e, f, d  │
  │                 │
  │     TRUE        │
  └─────────────────┘
L0:
        FALSE
```

RELATED ART
FIG.1B

```
fcmp   x, 0, fcc
  ┌ ─ ─ ─ ─ ─ ─ ─ ─ ┐

┌─────────────────┐
  │ fadd   b, c, a  │
  │ fmul   e, f, d  │
  │   ...           │
  │     TRUE        │
  │     FALSE       │
  └─────────────────┘
stdfr
```

RELATED ART
FIG.1C

```
do I=1,N
  if(x(i)>0)then
    a(i)=b(i)+c(i)
    d(i)=e(i) * f(i)
    ...
  endif
enddo
```

RELATED ART
FIG.4A

```
jjj=0
do i=1,N
  if(x(i)>0)then
    jjj=jjj+1
    index(jjj)=i
  endif
enddo
```
⌐ c

```
do j=1,jjj
  i=index(j)
  a(i)=b(i)+c(i)
  d(i)=e(i) * f(i)
  ...
enddo
```
⌐ d

RELATED ART
FIG.4B

EXECUTION CONTROL METHOD AND INFORMATION PROCESSING APPARATUS

CROSS-REFERENCE TO RELATED APPLICATIONS

This application is a continuing application, filed under 35 U.S.C. section 111(a), of International Application PCT/JP2012/077599, filed on Oct. 25, 2012, the entire contents of which are incorporated herein by reference.

FIELD

This technique relates to a technique for controlling execution of object codes.

BACKGROUND

Along with the advancement of the supercomputer, application programs, which are executed on the super computer, becomes complicated. For example, a processing (e.g. simple DO loop processing) to repeatedly perform a single processing content along a space axis and/or time axis was a main stream, however, now, the processing content is changed according to individual spaces and/or the processing content is changed according to the time progress. In other words, an application program, which includes a processing to cope with various conditions (which correspond to IF sentences in the program codes) in the loop processing, is developed to execute much realistic simulation on the computer. Then, one object in this field is how to execute the application program, which complexly works as described above, on the high-performance computer at high speed.

As a method for speeding up the execution of codes that include the IF sentence in a DO loop by compiler optimization, there exists an acceleration method using a predicated instruction and an acceleration method by generating a list vector.

For example, in case of the DO loop that includes an IF sentence as illustrated in FIG. 1A, codes as illustrated in FIG. 1B are generated, typically. In other words, the codes are generated so that, if x(i)>0 is true, instructions surrounded with "TRUE" are executed, and if x(i)>0 is false, instructions for the FALSE case are executed by jumping to a line "L0" from a branch instruction fble. On the other hand, when the predicated instruction is used, codes are generated as illustrated in FIG. 1C. As illustrated in a dotted-line rectangle in FIG. 1C, the codes are generated so that, the branch instruction is not included and the instructions for the TRUE case and the instructions for the FALSE case are always executed, and if x(i)>0 is false, a predicated "store" instruction for the TRUE case is cancelled and a computational result for the TRUE case is discarded.

Therefore, for example, in case of the code that no processing is performed in case of the FALSE case for the IF sentence in the DO loop, as illustrated in FIG. 2, when the condition of the IF sentence is always determined to be true, in other words, when a true rate (=(the number of times of execution of the instructions for the TRUE case)/(the number of times of execution of the DO loop)) is 100%, all of the executed instructions are effective. On the other hand, for example, when the true rate is not 100%, however, is high like 90%, there are a lot of effective instructions "a" among the executed instructions. However, redundant instructions partially appear. Then, when the true rate becomes low like 10%, the number of effective instructions becomes lesser and the redundant instructions "b" increases. In other words, when the true rate is not high, a lot of computational results are discarded. Accordingly, an effect of high efficiency of the instruction execution cannot be obtained.

According to this method, in case where the DO loop is repeatedly executed as illustrated in FIG. 3A, when the true rate is high and almost constant, the number of effective instructions increases entirely, and the effect of the acceleration can be obtained. On the other hand, as illustrated in FIG. 3B, when the true rate is low and almost constant, the number of redundant instructions increases entirely, and the effect of the acceleration cannot be obtained, entirely. Thus, when the true rate is almost constant, the method using the predicated instruction is effective if the true rate is high. However, as illustrated in FIG. 3C, when a situation that the true rate largely changes occurs while the DO loop is executed repeatedly, there is a problem that the efficiency of the instruction execution largely decreases on the way of the execution. When the predicated instruction is used, as schematically illustrated in FIGS. 3A to 3C, the processing time itself is constant regardless of the true rate, and the efficiency of the instruction execution changes.

Moreover, as for the DO loop including the IF sentence as illustrated in FIG. 4A, when there are instructions in the TRUE case and there is no instruction in the FALSE case, codes as schematically illustrated in FIG. 4B are generated according to the method that generates the list vector. In other words, a code "c" for a loop that an index i in the case where the condition of the IF sentence is true is set to a list vector index(jjj) and a code "d" for a loop (also called "a list vector loop") to repeat computation only for the index i set in the list vector index(jjj) are generated. Namely, an IF clause and a THEN clause are separated, and the THEN clause without any branch instruction is speeded up.

In the method for generating the list vector as described above, the code "c" for generating the list vector is always executed regardless of the true rate. However, as schematically illustrated in FIG. 5A, the number of indices that are included in the list vector becomes greater when the true rate is high like 90%, for example, and the processing time for the list vector loop becomes long. On the other hand, as schematically illustrated in FIG. 5B, the number of indices that are included in the list vector becomes lesser when the true rate is low like 10%, for example, the processing time for the list vector loop is shortened. Thus, when there are instructions if the condition of the IF sentence is TRUE and there is no instruction if the condition is FALSE, the processing time is shortened if the true rate is lower. When the state where the true rate is low is kept as described above, it is efficient to employ the method for generating the list vector. However, as illustrated in FIG. 5C, even if the efficient execution is initially performed because the true rate is low, when the situation is changed on the way of the execution to a situation that the true rate increases, the execution is not entirely performed efficiently.

No conventional arts propose any method to cope with such a problem.

Patent Document 1: Japanese Laid-open Patent Publication No. 59-165147

SUMMARY

An execution control method relating to this technique includes: (A) while a first code for a loop included in a source code or a second code is executed, obtaining a feature amount concerning a number of times that a condition of a conditional branch is true, wherein the loop internally includes the conditional branch and is designated in advance, the first code is included in an object code that is generated from the source code and the conditional branch is just coded in the first code, and the second code is included in the object code and is a code to perform computation of a branch destination to be executed for a case where the condition of the conditional branch is true, only for loop indices that were extracted as the condition of the conditional branch being true; and (B) causing a processor to execute, based on the obtained feature amount, either of the second code and a third code included in the object code, wherein the third code is a code to write, by using a predicated instruction and into a memory, any computation result of computations of branch destinations by the conditional branch.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1A is a diagram depicting an example of source codes;

FIG. 1B is a diagram depicting an example of codes for a normal processing;

FIG. 1C is a diagram depicting an example of codes using a predicated instruction;

FIG. 4A is a diagram depicting an example of source codes;

FIG. 4B is a diagram schematically depicting codes that generate a list vector;

DESCRIPTION OF EMBODIMENTS

Figure 6:
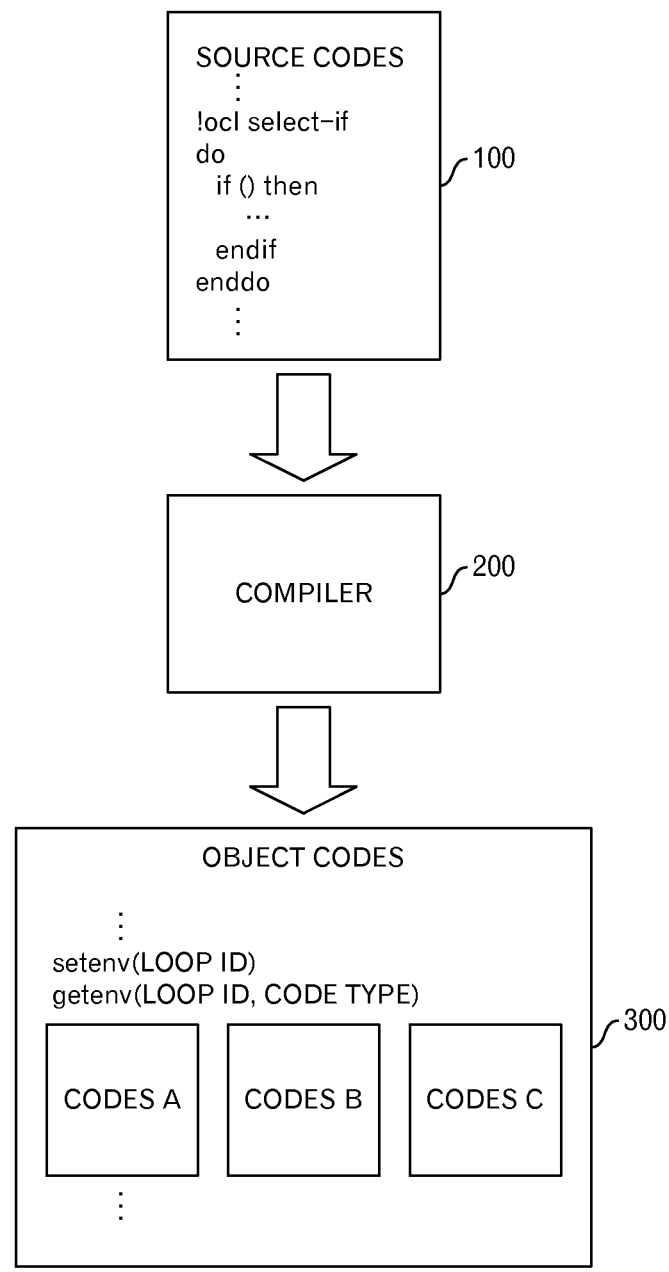
FIG. 6 is a diagram to explain a pre-processing in an embodiment.

An outline of a pre-processing in this embodiment of this technique will be explained by using FIG. 6. As illustrated in FIG. 6, a user who uses a run-time module relating to this embodiment inserts a "! ocl select-if" sentence as an instruction sentence to a compiler 200 immediately before a loop that includes an IF sentence and is to be speeded up in source codes 100. In this embodiment, an example will be explained in which the computation is performed if a condition of the IF sentence is true, however, the computation is not performed if the condition of the IF sentence is false.

When the source codes 100 into which the aforementioned instruction sentence is inserted is inputted, the compiler 200 relating to this embodiment normally compiles portions into which no instruction sentence is inserted. On the other hand, the compiler 200 generates following codes for the portion to which the instruction sentence is inserted. In other words, (A) codes A for normally performing a conditional branch, (B) codes B using the predicated instruction, (C) codes C for generating the list vector, (D) an instruction "setenv (loop ID)" for setting run-time environment variables that include an identifier (i.e. loop ID) of the loop, the number of times of repetition within the loop and the number of times of execution of the loop for the run-time module as described below (this instruction is inserted immediately before the codes A to C) and (E) an instruction "getenv (loop ID, code type)" for accepting setting of the loop ID and code type from the run-time module are generated.

The codes A are codes as illustrated in FIG. 1B, and are codes for a loop into which a conditional branch is coded as it is. Moreover, the codes B are codes as illustrated in FIG. 1C, and are codes for a loop so as to write, into a memory by using the predicated instruction, any computational result of the branch destination computations by the conditional branch. More specifically, these are codes for a loop so as to write, into the memory by the predicated instruction, the computational result of the branch destination computation in the TRUE case only when the condition of the conditional branch is true. Furthermore, the codes C are codes as illustrated in FIG. 4B, and are codes to execute the branch destination computation in case where the condition of the conditional branch is true, only for extracted loop indices after extracting, as the list vector, loop indices for which the condition of the conditional branch is true.

Generation of such object codes 300 may be performed by the same computer as the computer that executes the object codes 300 or may be performed by another computer.

Figure 2:
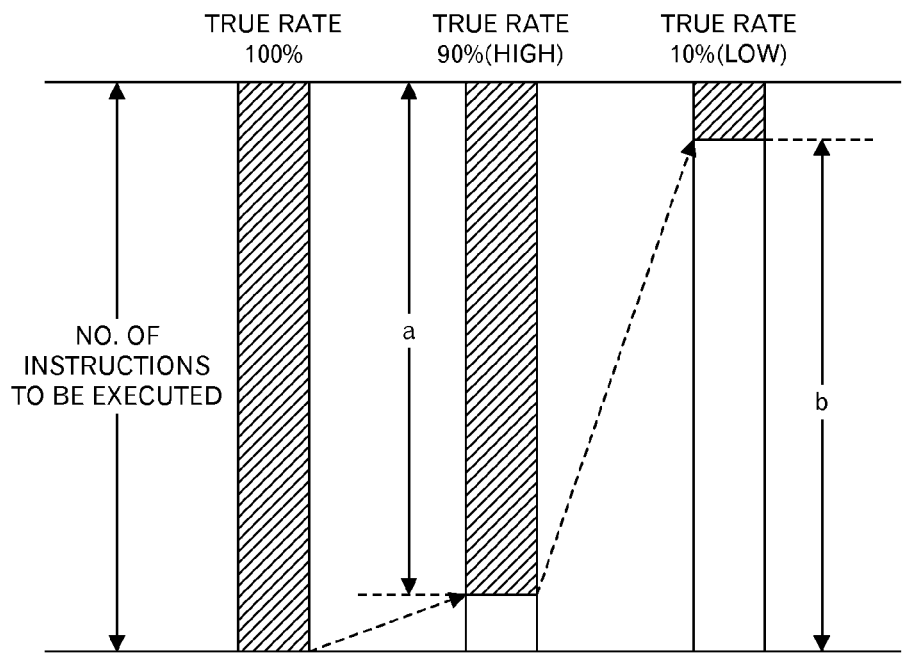
FIG. 2 is a diagram to explain a true rate and execution efficiency.
Figure 3A:
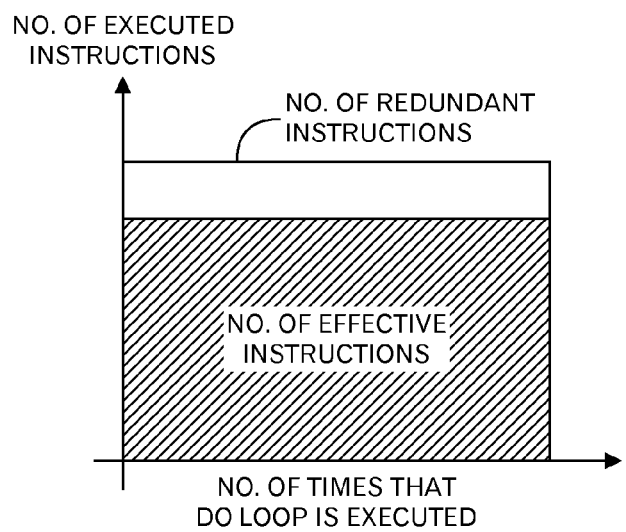
FIG. 3A is a diagram to explain the true rate and the execution efficiency.
Figure 3B:
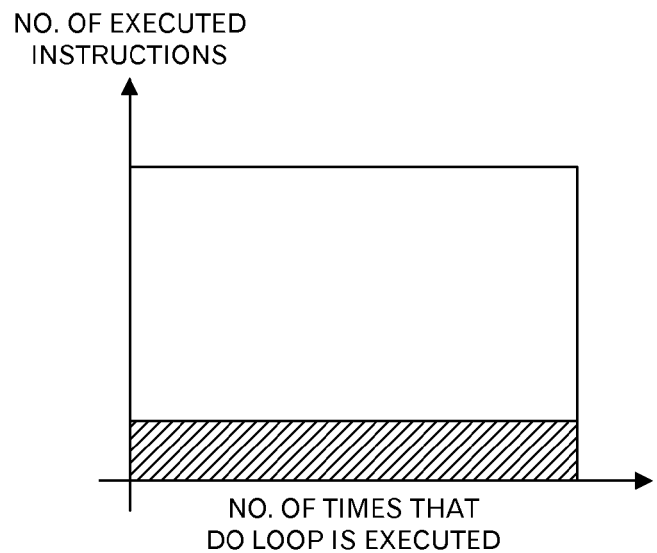
FIG. 3B is a diagram to explain the true rate and the execution efficiency.
Figure 3C:
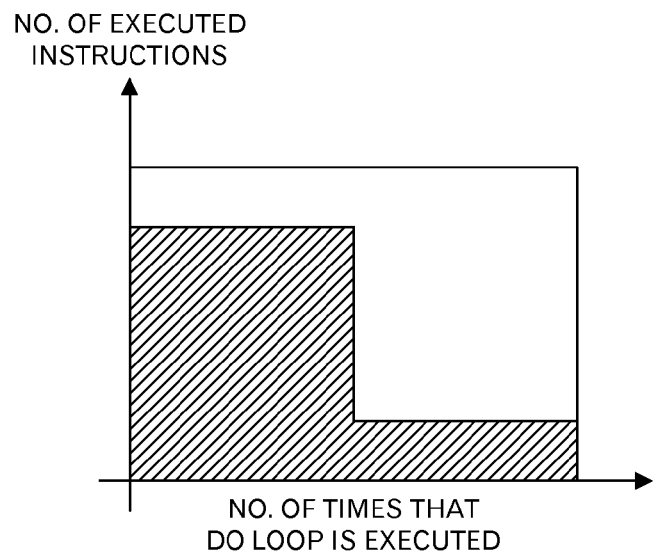
FIG. 3C is a diagram to explain the true rate and the execution efficiency.
Figure 5A:
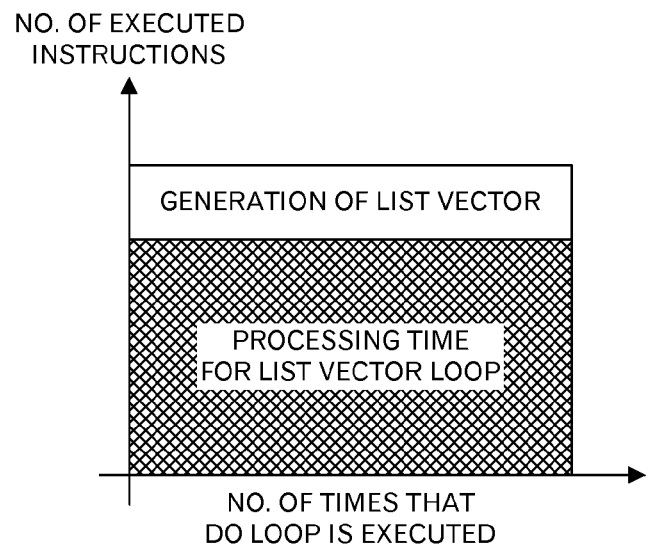
FIG. 5A is a diagram to explain the true rate and a processing time.
Figure 5B:
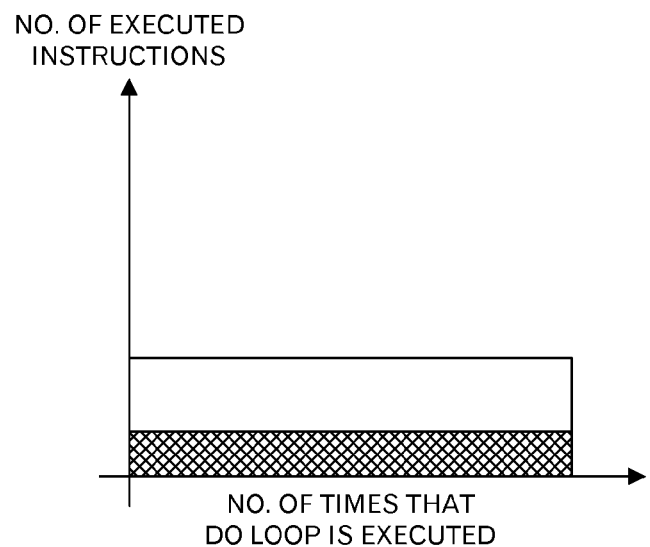
FIG. 5B is a diagram to explain the true rate and processing time.
Figure 5C:
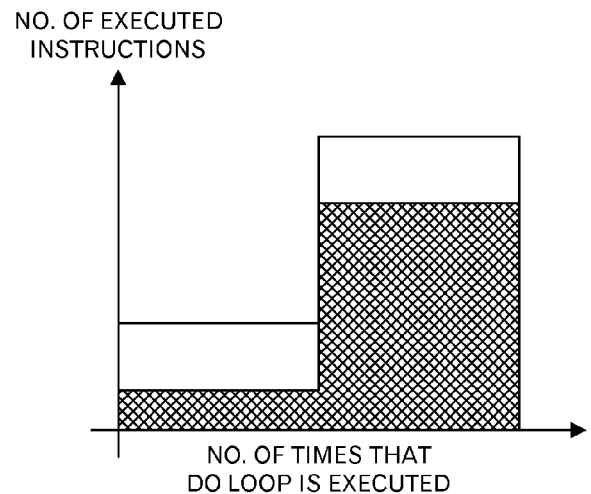
FIG. 5C is a diagram to explain the true rate and the processing time.
Figure 7:
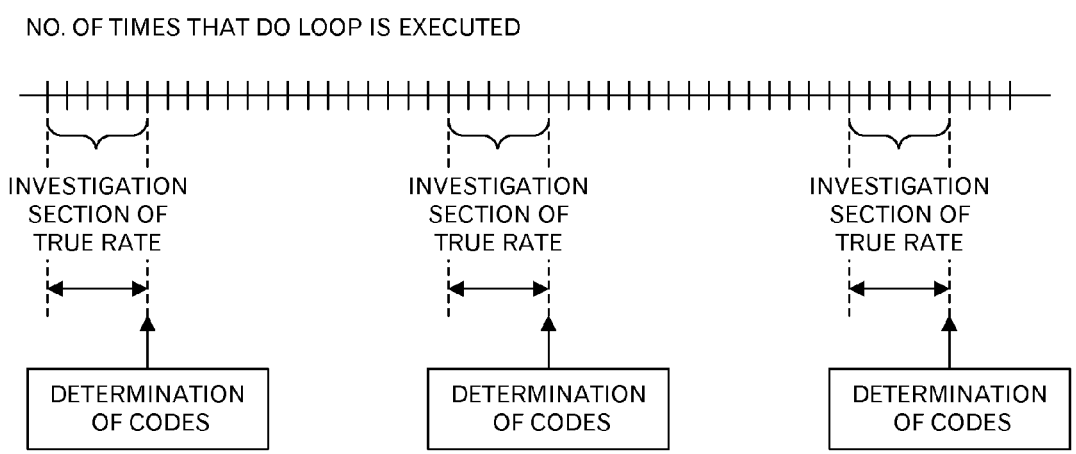
FIG. 7 is a diagram depicting an outline of execution control relating to this embodiment

Next, an outline of execution control for the object codes 300, which were generated as described above, will be explained by using FIG. 7. The intervals of the horizontal axis in FIG. 7 represent the number of times of the execution of the loop for which the codes A to C were generated. In an example of FIG. 7, because the loop itself is repeatedly executed many times, the run-time module investigates, as the true rate, a ratio that the condition in the IF statement within the loop is true, while the loop is executed 5 times, initially by using the codes A, for example. The run-time module performs setting so as to execute any of the codes B and C according to a feature amount (an average value, the minimum value of the true rates) of the true rates, which were obtained in an investigation section of the true rates, after the completion of this investigation section of the true rate. As described in the background arts, the codes B are effective when the true rate is high. Therefore, when the feature amount of the true rates exceeds a threshold, the codes B are set to be executed, and when the feature amount of the true rates is equal to or less than the threshold, the codes C are set to be executed.

After that, in the example of FIG. 7, after the codes set to be executed are executed 15 times, the investigation section of the true rate appears again. In the second or subsequent investigation section of the true rate, the feature amount of the true rates is obtained by executing the codes C as they are when the codes C were executed up to this investigation section, in this embodiment. On the other hand, when the codes B were executed up to this investigation section, the feature amount of the true rates is obtained by executing the codes A in the investigation section of the true rate. Then, after the completion of this investigation section of the true rate, as described above, the run-time module sets the codes B to be executed when the feature amount of the true rates exceeds the threshold and sets the codes C to be executed when the feature amount of the true rates is equal to or less than the threshold.

The aforementioned processing is repeated until the designated DO loop is not executed. Thus, even when the true rate changes while repeating the execution of the DO loop, it is possible to switch the execution to the efficient codes, dynamically, without continuously executing inefficient codes.

Although it will be explained later, the effect of the acceleration cannot be obtained if the cost required to obtain data used for calculating the true rate is high. Therefore, a hardware counter included in a Central Processing Unit (CPU) is utilized. A lot of kinds of CPUs have hardware counters that can count the number of times of the computation when the condition of the IF sentence is true during the execution of the application program, the number of times of the computation when the condition of the IF sentence is false, the number of times of the execution of the loop, the number of times of the repetition within the loop and the like. The cost required to obtain data to be used for the calculation of the true rates is suppressed by reading out, by the run-time module, the counter values, which are saved in the aforementioned hardware counters.

Next, a computer 1000 that executes the object codes 300 will be explained by using FIG. 8. The computer 1000 has a CPU 1100, a memory 1200, and a data storage unit 1300 such as a hard disk drive.

The data storage unit 1300 stores a file of the object codes 300 and a file of the run-time module 400, and these files are loaded to the memory 1200 in response to an instruction from a user. In this embodiment, an image of the object codes 300 in the memory 1200 is represented as object codes 1220, and an image of the run-time module 400 in the memory 1200 is represented as a run-time module 1201. When the run-time module 1210 is executed by the CPU 1100, a loop identifying unit 1211, a true-rate calculation unit 1212 and a code determination unit 1213 are realized. Moreover, the run-time module 1210 has a setting data storage unit 1214 that stores setting data by the user. The setting data storage unit 1214 stores setting data such as a threshold for the feature amount of the true rates, the number of times of the execution of the loop in the investigation section of the true rate, the number of times of the execution of the loop, which corresponds to an interval of the investigation section of the true rate, an indicator type used as the feature amount of the true rates (e.g. average value, the minimum value or the like). The object codes 1220 include the codes A to C for the loop designated by the user.

Moreover, as described above, the CPU 1100 has plural hardware counters, and has a first counter to count the number of times that codes in the case where the condition of the IF sentence is true are executed, a second counter to count the number of times of the execution of the loop, and a third counter to count the number of times of the repetition within the loop.

Next, a processing in the case where the object codes 300 are executed will be explained by using FIGS. 9 to 20. Firstly, in response to an instruction from the user, the CPU 1100 loads the object codes 300 and the run-time module 400 to the memory 1200 from the data storage unit 1300, and starts to execute them (step Si). Then, when the codes for the loop designated by the user are executed, the run-time module 1210 executes an execution control processing (step S3). The execution control processing will be explained by using FIGS. 10 to 14.

Firstly, the loop identifying unit 1211 waits until a loop to be investigated for the true rate is detected (step S11). As schematically illustrated in FIG. 6, in response to the setenv instruction, the loop identifying unit 1211 of the run-time module 1210 recognizes that a portion for which the dynamic switching of the codes is to be performed, and obtains execution environment variables including the loop ID, the number of times of the repetition within the loop, and the number of times of the execution of the loop.

Moreover, the loop identifying unit 1211 initializes the counter for the number of times of the execution of the loop and the counter for the check of the true rate to "0" (step S13). In case of the loop ID, which is initially detected, it is still unknown which codes are preferred to be executed. Therefore, the code determination unit 1213 performs setting to execute codes for the normal processing, in other words, the codes A in this embodiment (step S15). In the object codes 1220 side, an execution instruction of the codes A is identified by the getenv instruction to start the execution of the codes A.

Then, the true-rate calculation unit 1212 determines, based on the value of the counter for the check of the true rate, whether or not the investigation section of the true rate has been ended (step S17). For example, in the example of FIG. 7, the number of times of the execution of the loop, which corresponds to the investigation section of the true rates is "5". Therefore, it is determined whether or not the counter value of the counter for the check of the true rate is equal to or greater than "5". When the investigation section of the true rate has not been ended, the true-rate calculation unit 1212 performs a true-rate investigation processing (step S19). The true-rate investigation processing will be explained by using FIGS. 11 and 12.

The true-rate calculation unit 1212 obtains the counter values of the first counter in the CPU 1100 (i.e. a counter whose value is counted up when the condition of the IF sentence is true), the second counter (i.e. a counter for the number of times of the execution of the loop) and the third counter (i.e. a counter for the number of times of the repetition of the loop), and stores the obtained counter values in the memory 1200 (step S41). In order to obtain the current value of the first counter, the counter value of the first counter is obtained before executing the loop. Then, after the counter value of the third counter increases by "N" if the number of times of the repetition of the loop is "N" or after the counter value of the second counter increases by "1" (step S43), the true-rate calculation unit 1212 obtains the counter value of the first counter in the CPU 1100, and stores the counter value of the first counter in the memory 1200 (step S45). Then, the true-rate calculation unit 1212 calculates the true rate of the current loop by {(the counter value of the first counter, which was obtained at the step S45)–(the counter value of the first counter, which was obtained at the step S41)}/N, and stores the true rate in the memory 1200 (step S47). Then, the true-rate calculation unit 1212 increments the counter for the check of the true rate by "1" (step S49). After that, the processing returns to the calling-source processing.

Figure 10:
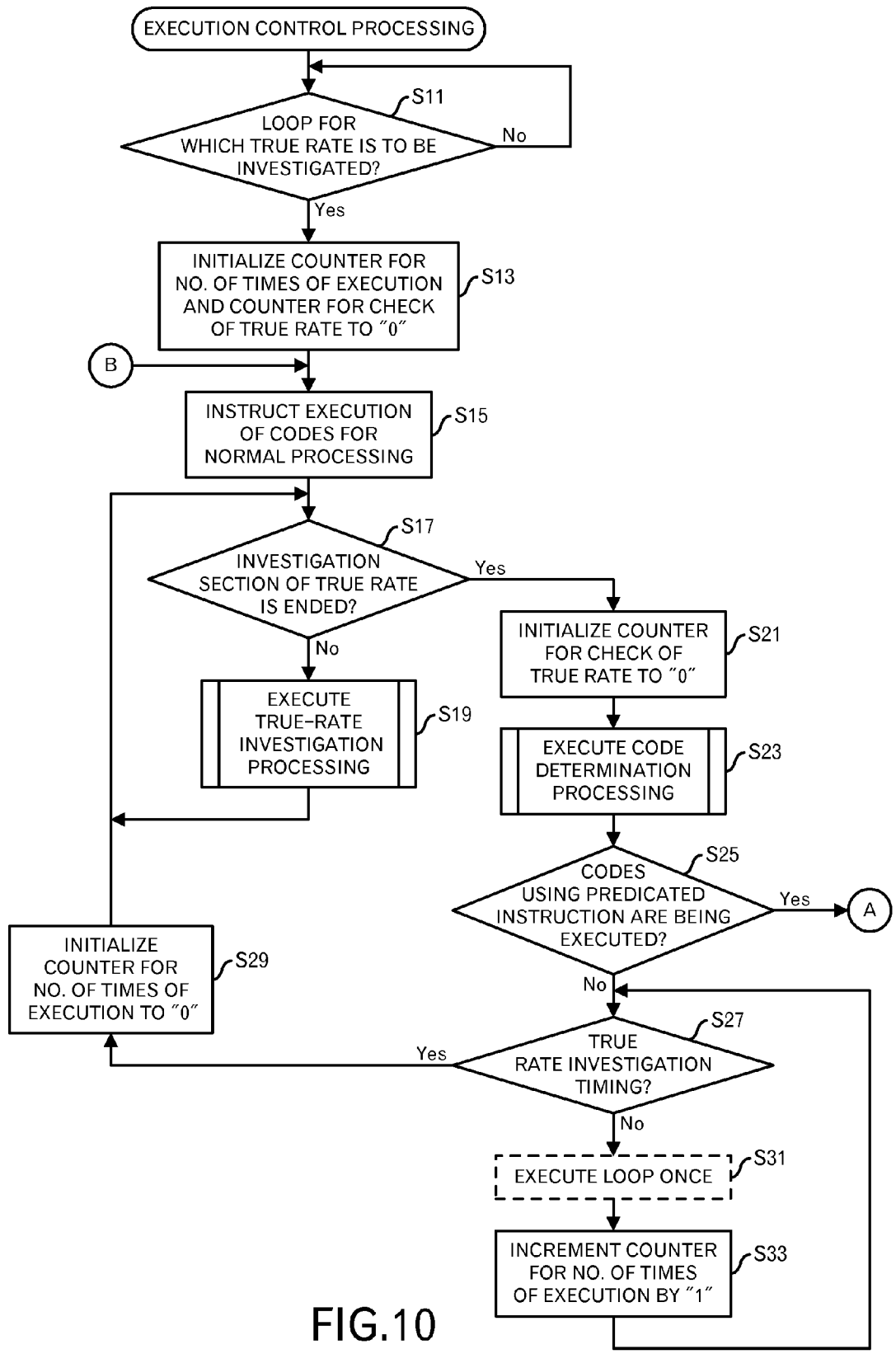
FIG. 10 is a diagram depicting a processing flow of an execution control processing.
Figure 12:
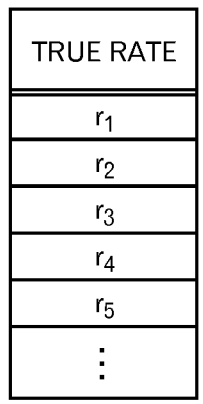
FIG. 12 is a diagram depicting an example of a true-rate investigation result.

Returning to the explanation of the processing in FIG. 10, the processing returns to the step S17 after the step S19. When such a true-rate investigation processing is repeated 5 times, data as illustrated in FIG. 12 is stored in the memory 1200, for example. In an example of FIG. 12, 5 true rates are obtained. Data concerning the number of times that the condition is true may be saved.

When it is determined at the step S17 that the investigation section of the true rate is ended, the true-rate calculation unit 1212 initializes the counter for the check of the true rates to "0" (step S21). Then, the code determination unit 1213 executes a code determination processing based on the check result of the true rates (step S23). The code determination processing will be explained by using FIG. 13.

Figure 13:
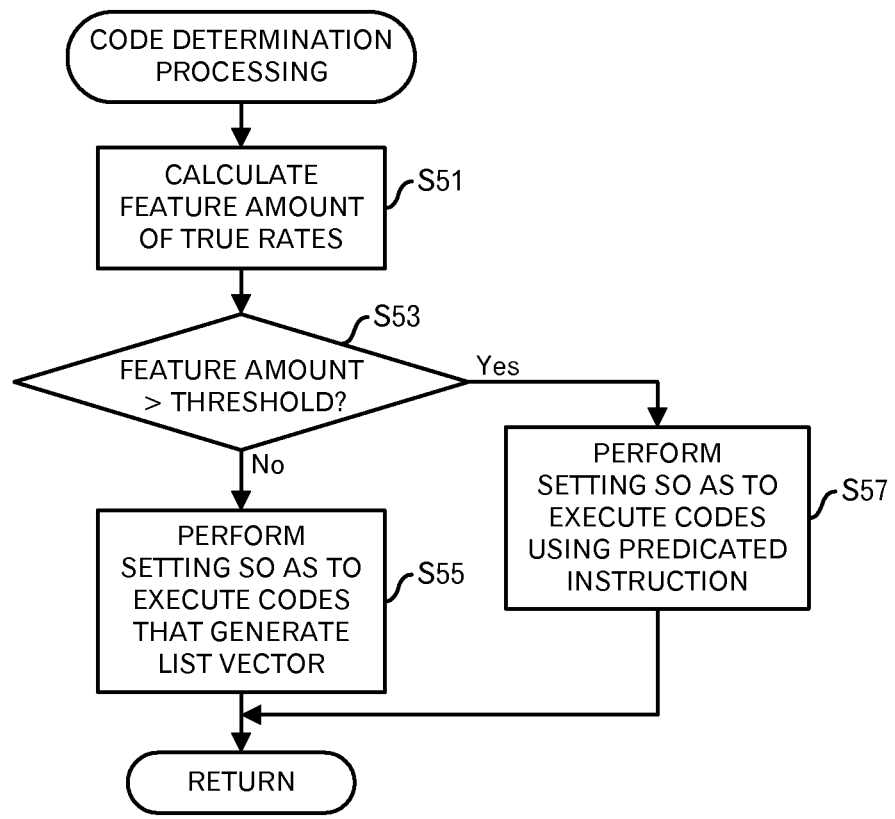
FIG. 13 is a diagram depicting a processing flow of a code determination processing.

The code determination unit 1213 calculates the feature amount of the true rates (FIG. 13: step S51). The feature amount of the true rates is a feature amount whose type is set in the setting data storage unit 1214, and, for example, is an average value or the minimum value. For example, in the example of FIG. 12, in case of the average value, $(r_1+r_2+r_3+r_4+r_5)/5$ is calculated, and in case of the minimum value, the minimum value among $r_1$ to $r_5$ is identified. The minimum value is employed because the risk is lower when the codes C that generates the list vector are executed. In other words, this is because the penalty for the processing time is greater, when the codes B using the predicated instruction, are selected and the true rate becomes low.

Then, the code determination unit 1213 determines whether or not the feature amount of the true rates exceeds the threshold stored in the setting data storage unit 1214 (step S53). When the feature amount of the true rates exceeds the threshold, the code determination unit 1213 sets the codes B, in other words, codes that use the predicated instruction, so as to be executed (step S57). The object codes 1220 side starts to execute the codes B according to the setting. Then, the processing returns to the calling-source processing.

When the true rate is high, the processing time does not change. However, because the possibility is high that the computational result is employed, the codes can be executed efficiently.

On the other hand, when the feature amount of the true rates is equal to or less than the threshold, the code determination unit 1213 performs setting so as to execute the codes C, in other words, the codes to generate the list vector (step S55). The object codes 1220 side starts to execute the codes C according to the setting. Then, the processing returns to the calling-source processing.

Thus, when the true rate is low, the processing time is shortened, and the acceleration of the processing can be made.

Returning to the explanation of FIG. 10, after the step S23, when the codes B that use the predicated instruction is being executed (step S25: Yes route), the processing shifts to a processing in FIG. 14 through terminal A. On the other hand, when the codes C are being executed (step S25: No route), the true-rate calculation unit 1212 determines whether or not the present time is a timing for the investigation of the true rate (step S27). This step is performed by determining whether or not the counter value of the counter for the number of times of the execution of the loop is equal to or greater than the interval of the investigation section of the true rate (e.g. 15), which is stored in the setting data storage unit 1214.

When the present time is not the investigation timing of the true rate (step S27: No route), after the counter value of the third counter is increased by "N" in case where the number of times of the repetition of the loop is N or after the counter value of the second counter is increased by "1" (step S31), the true-rate calculation unit 1212 increments the counter value of the counter for the number of times of the execution of the loop by "1" (step S33). Then, the processing returns to the step S27.

On the other hand, when the number of times of the execution of the loop reached the interval (e.g. "15") of the investigation section of the true rate, and the present time is the investigation timing of the true rate (step S27: Yes route), the true-rate calculation unit 1212 initializes the counter value of the counter for the number of times of the execution of the loop to "0" (step S29), and the processing returns to the step S17. By doing so, the calculation of the true rate is performed again.

Figure 14:
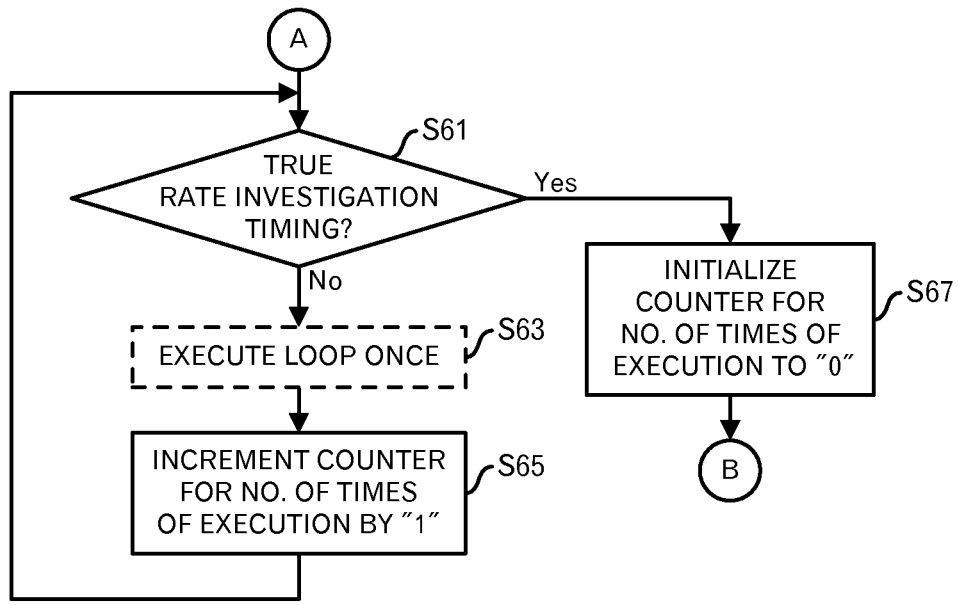
FIG. 14 is a diagram depicting a processing flow of the execution control processing.

Next, shifting to the explanation of the processing in FIG. 14, when the codes B are being executed, the true-rate calculation unit 1212 determines whether or not the present time is the investigation timing of the true rate (step S61). This is performed by determining whether or not the counter value of the counter for the number of times of the execution of the loop is equal to or greater than the interval (e.g. "15") of the investigation section of the true rate, which is stored in the setting data storage unit 1214.

When the present time is not the investigation timing of the true rate (step S61: No route), after the counter value of the third counter is increased by "N" in case where the number of times of the repetition of the loop is "N" or after the counter value of the second counter is increased by "1" (step S63), the true-rate calculation unit 1212 increments the counter value of the counter for the number of times of the execution of the loop by "1" (step S65). Then, the processing returns to the step S61.

On the other hand, when the number of times of the execution of the loop reached the interval (e.g. "15") of the investigation section of the true rate and the present time is the investigation timing of the true rate (step S61: Yes route), the true-rate calculation unit 1212 initializes the counter value of the counter for the number of times of the execution of the loop to "0" (step S67), and the processing returns to the step S15 in FIG. 10.

Because the IF sentence is removed in the execution of the codes B, the calculation of the true rate cannot be performed using the first counter in the CPU 1100. Therefore, the calculation of the true rate is performed by returning to the step S15 to instruct to execute the codes A for the normal processing.

By repeating this processing until the execution of the object codes 1220 is ended, the computational processing is made efficient by executing codes according to the true rate even when the true rate fluctuates.

Figure 15:
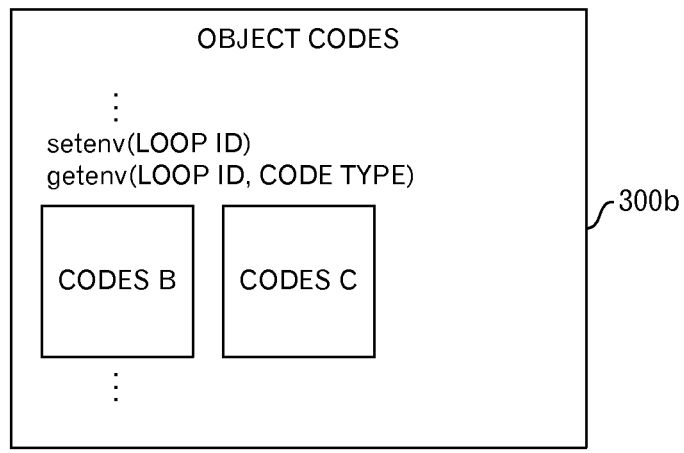
FIG. 15 is a diagram depicting an example of object codes relating to a modified example.

In the aforementioned example, the processing to generate the codes A that process the conditional branch as it is, the codes B using the predicated instruction and the codes C that generates the list vector was explained. However, as schematically illustrated in FIG. 15, the codes A may not be generated, however, the object codes 300b that include only the codes B and the code C may be generated.

Figure 16:
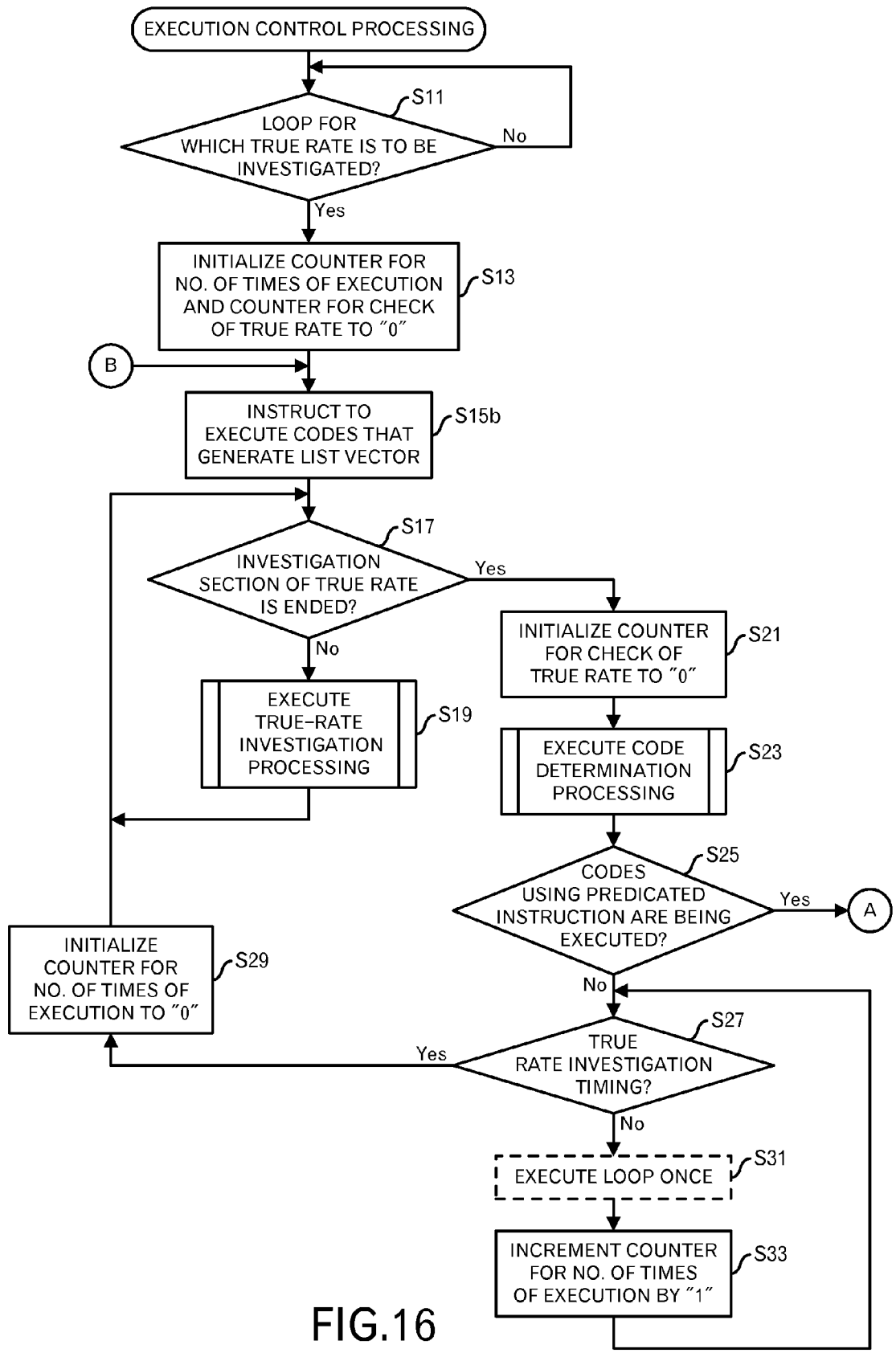
FIG. 16 is a diagram depicting a modified example of a processing flow of the execution control processing.

In other words, the codes C may be executed for portions in which the codes A are instructed to be executed in the execution control processing. When the codes C are executed, the true rate can be calculated. Therefore, it is possible to dynamically switch the execution between the codes B and the codes C in accordance with the true rate. The step S15 in the processing flow in FIG. 10 is changed as follows: In other words, the code determination unit 1213 performs setting so as to execute the codes C for generating the list vector (FIG. 16: step S15b).

Figure 17:
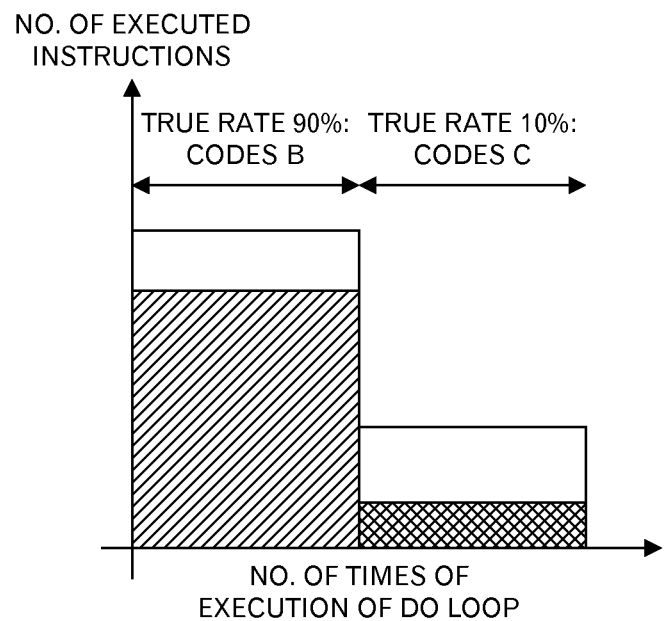
FIG. 17 is a diagram depicting a processing time in the modified example.

In case where the codes B and the codes C are used, as schematically illustrated in FIG. 17, when a state that the true rate is 90% and high is suddenly changed to a state that the true rate is 10% and low, the execution state is shifted from a state that the codes B are executed to a state that the codes C are executed. Then, the processing time is shortened drastically when the codes C comes to be executed, and the efficient computation is performed. The hatching during the execution of the codes B schematically represents a rate of the execution of the effective instructions, and the hatching during the execution of the codes C schematically represents a processing time of a list vector loop in FIG. 17.

Here, "Tm" represents a processing time per one DO loop, "a" represents the entire number of times of the execution of the DO loop, "b" represents the number of times of the execution of the DO loop in case of the true rate "Truex", "α" represents a processing time required to generate the list once, and the true rates "Truex" and "Truey" are real values, which are equal to or greater than 0 and are equal to or less than 1.

In this state, when the codes B are executed all of "a" times, the processing time by the codes B is aTm. Moreover, the processing time for the codes C are represented as follows:

$$b(TruexTm + \alpha) + (a - b)(TrueyTm + \alpha) = \quad (1)$$
$$TruexbTm + b\alpha + TrueyaTm - TrueybTm + (a - b)\alpha =$$
$$(Truex - Truey)bTm + TrueyaTm + a\alpha$$

Furthermore, like this embodiment, the processing time when the codes B are executed in case of the true rate Truex and the codes C are executed in case of the true rate Truey is represented as follows:

$$bTm + (a - b)(TrueyTm + \alpha) = \quad (2)$$
$$bTm + TrueyaTm - TrueybTm + (a - b)\alpha =$$

$$(1 - Truey)bTm + TrueyaTm + (a - b)\alpha =$$
$$((1 - Truey)b + Trueya)Tm + (a - b)\alpha$$

Here, a condition that hold aTm>the expression (2) is satisfied is represented as follows:

$$aTm > ((1-Truey)b + Trueya)Tm + (a-b)\alpha$$

$$aTm - ((1-Truey)b + Trueya)Tm > (a-b)\alpha$$

$$(1-Truey)aTm - (1-Truey)bTm > (a-b)\alpha$$

$$(1-Truey)(a-b)Tm > (a-b)\alpha$$

$$(1-Truey)Tm > \alpha \quad (3)$$

Furthermore, a condition that the expression (1)>the expression (2) is satisfied is represented as follows:

$$(Truex - Truey)bTm + TrueyaTm + a\alpha > ((1-Truey)b + Trueya)Tm + (a-b)\alpha$$

$$TruexbTm - bTm > -b\alpha$$

$$b\alpha > (1-Truex)bTm$$

$$\alpha > (1-Truex)Tm \quad (4)$$

Therefore, according to the expressions (3) and (4), a following condition is obtained.

$$(1-Truex)Tm < \alpha < (1-Truey)Tm$$

Figure 18:
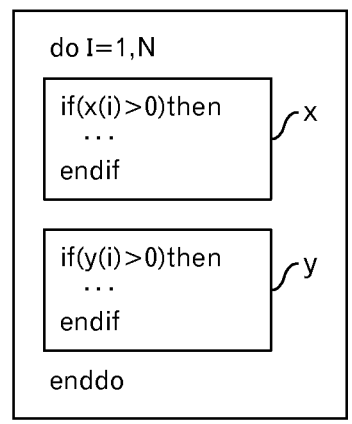
FIG. 18 is a diagram depicting an example of source codes including two IF sentences in a loop.
Figure 19:
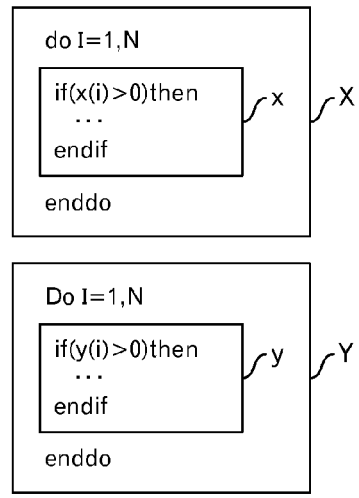
FIG. 19 is a diagram depicting an example of loop division.

There is a case where an IF block x and an IF block y are included in a loop as illustrated in FIG. 18. Typically, when there is no mutual dependence between computation within the IF block x and computation within the IF block y, loop division as illustrated in FIG. 19 is made. In other words, in an example of FIG. 19, the codes are divided into a loop X for the IF block x and a loop Y for the IF block y. By doing so, it becomes possible to execute different codes between the loop X and the loop Y. For example, the codes B are executed for the loop X because the true rate is high, and the codes C are executed for the loop Y because the true rate is low.

Furthermore, even when the true rate largely changes on the way of the execution in one loop or both loops, the computation can be efficiently performed by dynamically switching the execution between the codes B and the codes C according to the aforementioned processing flow.

Figure 20:
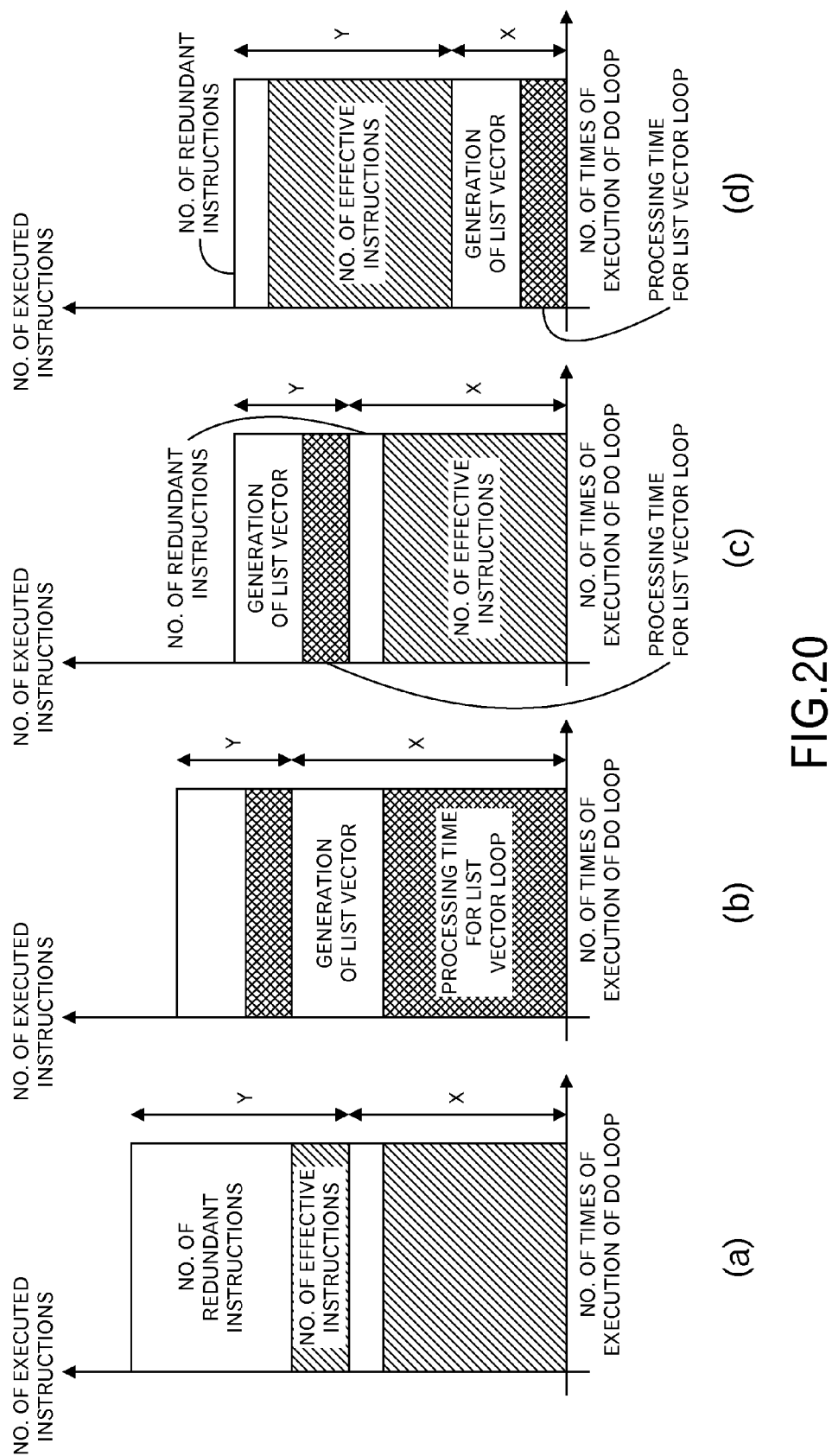
FIG. 20 is a diagram to explain processing times and the like in case of the loop division by (a) to (d)

For example, as illustrated in (a) of FIG. 20, when the codes B are executed for the loop X and loop Y, the loop Y is extremely inefficiently executed, and its processing time is long. On the other hand, as illustrated in (b) of FIG. 20, when the codes C are executed for the loop X and loop Y, it is not possible to largely shorten the processing time, because the processing time required for the list vector loop for the loop X is long. On the other hand, as illustrated in (c) of FIG. 20, when the codes B are executed for the loop X whose true rate is, for example, 90% and high and the codes C are executed for the loop Y whose true rate is, for example, 10% and low, the processing time is entirely shortened, and the efficient computation processing is performed. Similarly, when the true rate changes on the way of the execution, the true rate for the loop X becomes 10%, for example, and the true rate for the loop Y becomes 90%, for example, the codes C are executed for the loop X and the codes B are executed for the loop Y according to this embodiment. In such a case, as illustrated in (d) of FIG. 20, the processing time itself does not change compared with (c) of FIG. 20, when the number of times of the execution of the loop is the same. However, when the dynamic switching of the codes is not performed, the processing time for the loop for which the codes C are executed increases.

Although the embodiments of this technique were explained, this technique is not limited to those. For example, the processing flow is a mere example, and as long as the processing result does not change, the processing turns may be exchanged, or plural steps may be executed in parallel. Moreover, the functional block configuration of the run-time module 400 is a mere example, and may not correspond to the program module configuration.

Moreover, in the aforementioned example, an example was explained that the average value or the minimum value of the true rates is employed. However, when the investigation section of the true rate is short or the like, the threshold may be set for the true rate itself. Furthermore, when the number of times of the repetition of the loop is known in advance, the number of times that the condition is true, an average value of the numbers of times that the condition is true, or the minimum value of the numbers of times that the condition is true may be employed as the feature amount, instead of the true rate.

Furthermore, an example that the investigation section of the true rate is set periodically was explained. However, the interval of the investigation section of the true rate may be shortened while the true rate is lowering, for example. Accordingly, the execution can be shifted to the execution of the codes C early.

Figure 8:
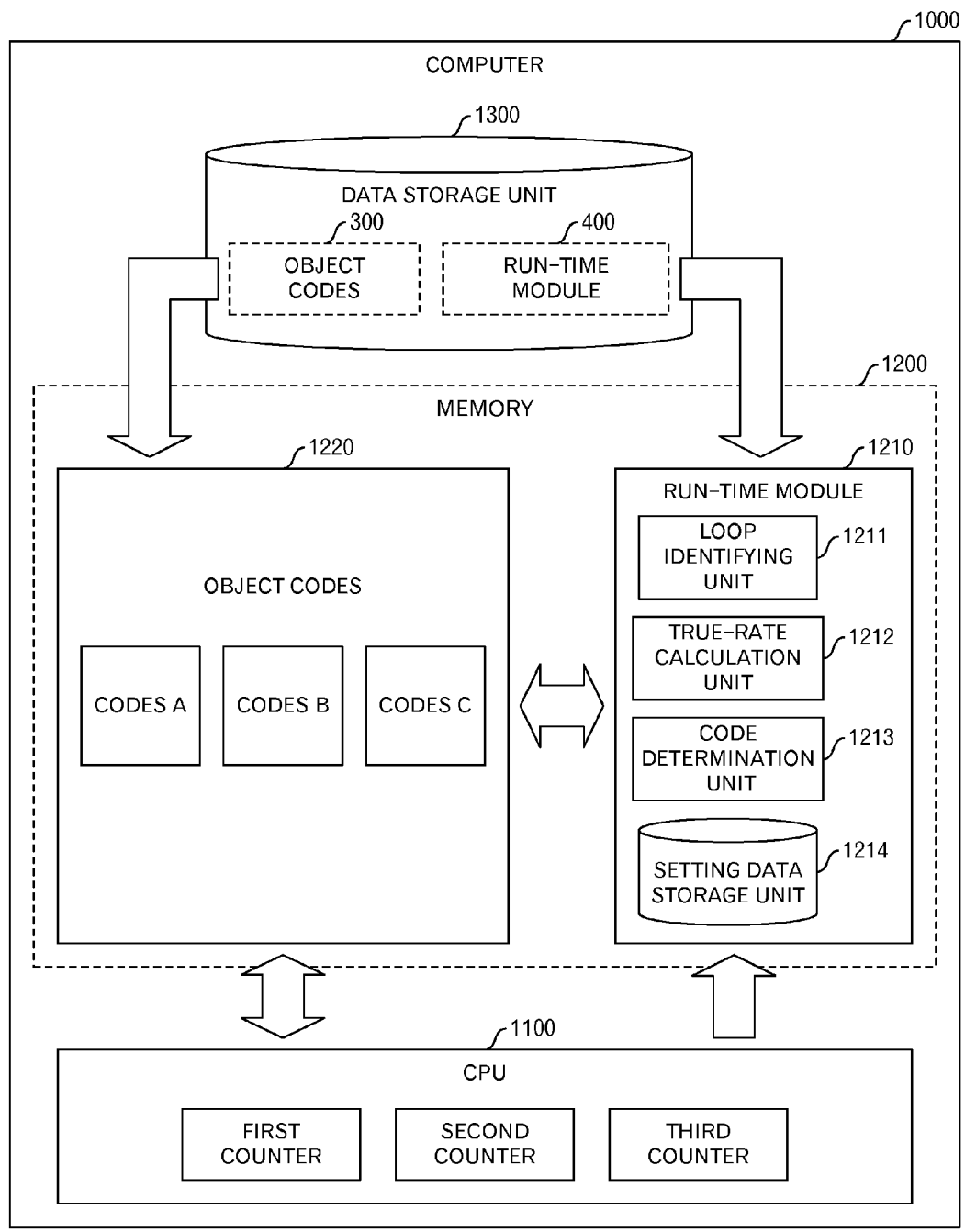
FIG. 8 is a diagram depicting a configuration of a computer relating to this embodiment.
Figure 9:
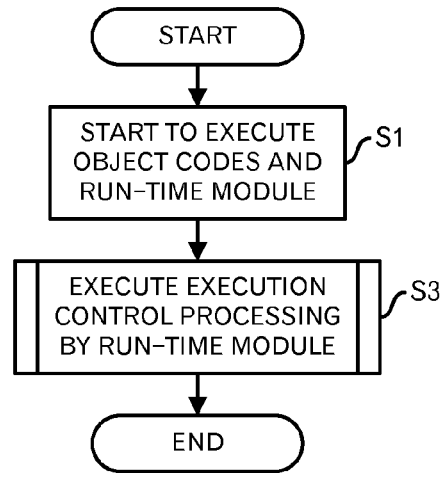
FIG. 9 is a diagram depicting a processing flow in this embodiment.
Figure 11:
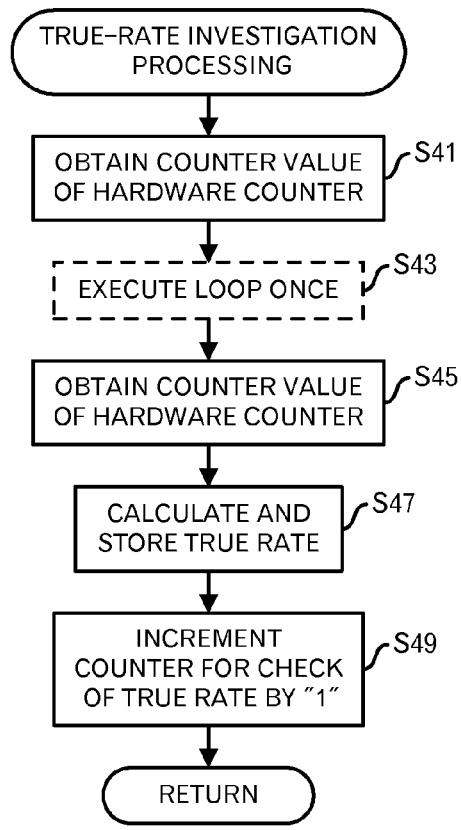
FIG. 11 is a diagram depicting a processing flow of a true-rate investigation processing.
Figure 21:
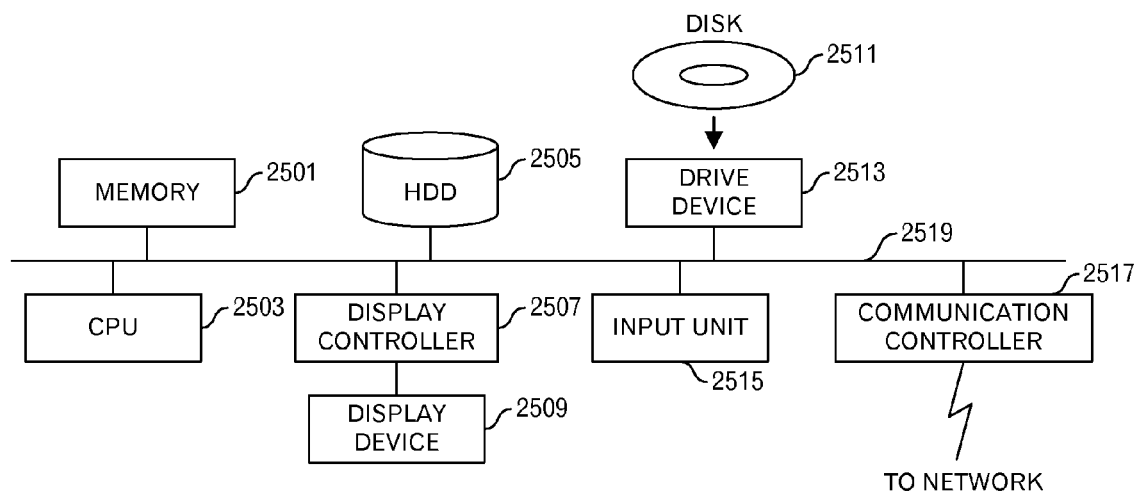
FIG. 21 is a functional block diagram of a computer.

In addition, as for the computer 1000 in FIG. 8, only portions relating to the embodiments, the computer 1000 is a computer device as illustrated in FIG. 21. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as shown in FIG. 77. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

An execution control method relating to this embodiment includes: (A) while a first code for a loop included in a source code or a second code is executed, obtaining a feature amount concerning a number of times that a condition of a conditional branch is true, wherein the loop internally includes the conditional branch and is designated in advance, the first code is included in an object code that is generated from the source code and the conditional branch is just coded in the first code, and the second code is included in the object code and is a code to perform computation of a branch destination to be executed for a case where the condition of the conditional branch is true, only for extracted loop indices after extracting loop indices for which the condition of the conditional branch is true; and (B) causing a processor to execute, based on the obtained feature amount, either of the second code and a third code included in the object code, wherein the third code is a code to write, by using a predicated instruction and into a memory, any computation result of computations of branch destinations determined by the conditional branch.

As described above, by dynamically switching codes to be executed, the computational processing can be executed efficiently, even when the number of times that the condition is true dynamically changes.

The feature amount may be either of the number of times, a rate of the number of times, an average value of numbers of times that the condition of the conditional branch is true, an average value of rates of the number of times, a minimum value of the numbers of times and a minimum value of the rates.

Furthermore, the aforementioned obtaining may be performed periodically or irregularly.

Furthermore, data concerning the number of times may be obtained from a counter in the processor. When the number of times is counted by a hardware counter, it is possible to decrease a cost for a processing for the execution control.

Incidentally, it is possible to create a program causing a processor to execute the aforementioned execution control processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program for causing a processor to execute a process, the process comprising:

obtaining a feature amount concerning a number of times that a condition of a conditional branch is true while a first code for a loop included in a source code or a second code is executed, the loop internally including the conditional branch and being designated in advance, the first code being included in an object code that is generated from the source code, the conditional branch being coded in the first code, and the second code being included in the object code and being a code to perform computation of a branch destination to be executed for a case where the condition of the conditional branch is true, only for loop indices that were extracted for which the condition of the conditional branch is true;
determining whether the obtained feature amount is greater than a threshold value;
causing the processor to execute the second code upon determining that the obtained feature amount is less than the threshold value; and
causing the processor to execute a third code that is included in the object code and is a code to write, by using a predicated instruction and into a memory, any result of computation of branch destinations by the conditional branch, upon determining that the obtained feature amount is greater than the threshold value.

2. The non-transitory computer-readable storage medium as set forth in claim 1, wherein the feature amount is any one of the number of times, a rate of the number of times, an average value of numbers of times that the condition of the conditional branch is true, an average value of rates of the number of times, a minimum value of the numbers of times and a minimum value of the rates.

3. The non-transitory computer-readable storage medium as set forth in claim 1, wherein the obtaining is performed periodically or irregularly.

4. The non-transitory computer-readable storage medium as set forth in claim 1, wherein data concerning the number of times is obtained from a counter in the processor.

5. An execution control method, comprising:
obtaining, by a processor, a feature amount concerning a number of times that a condition of a conditional branch is true while a first code for a loop included in a source code or a second code is executed, the loop internally including the conditional branch and being designated in advance, the first code being included in an object code that is generated from the source code, the conditional branch being coded in the first code, and the second code being included in the object code and being a code to perform computation of a branch destination to be executed for a case where the condition of the conditional branch is true, only for loop indices that were extracted for which the condition of the conditional branch is true;
determining whether the obtained feature amount is greater than a threshold value;
causing the processor to execute the second code upon determining that the obtained feature amount is less than the threshold value; and
causing the processor to execute a third code that is included in the object code and is a code to write, by using a predicated instruction and into a memory, any result of computation of branch destinations by the conditional branch, upon determining that the obtained feature amount is greater than the threshold value.

6. An information processing apparatus, comprising:
a memory; and
a processor configured to use the memory and execute a process, the process comprising:
obtaining a feature amount concerning a number of times that a condition of a conditional branch is true while a first code for a loop included in a source code or a second code is executed, the loop internally including the conditional branch and being designated in advance, the first code being included in an object code that is generated from the source code, the conditional branch being coded in the first code, and the second code being included in the object code and being a code to perform computation of a branch destination to be executed for a case where the condition of the conditional branch is true, only for loop indices that were extracted for which the condition of the conditional branch is true;
determining whether the obtained feature amount is greater than a threshold value;
causing the processor to execute the second code upon determining that the obtained feature amount is less than the threshold value; and
causing the processor to execute a third code that is included in the object code and is a code to write, by using a predicated instruction and into a memory, any result of computation of branch destinations by the conditional branch upon determining that the obtained feature amount is greater than the threshold value.

* * * * *